(12) United States Patent
Waymire et al.

(10) Patent No.: US 11,839,322 B1
(45) Date of Patent: Dec. 12, 2023

(54) ZESTING DEVICES, ASSEMBLIES, COMPONENTS, AND METHODS

(71) Applicants: Katherine Waymire, Minneapolis, MN (US); Melessa E. Paynter, St. Michael, MN (US)

(72) Inventors: Katherine Waymire, Minneapolis, MN (US); Melessa E. Paynter, St. Michael, MN (US)

( * ) Notice: Subject to any disclaimer, the term of this patent is extended or adjusted under 35 U.S.C. 154(b) by 507 days.

(21) Appl. No.: 15/063,509

(22) Filed: Mar. 7, 2016

Related U.S. Application Data

(60) Provisional application No. 62/129,587, filed on Mar. 6, 2015.

(51) Int. Cl.
  *A47J 43/25* (2006.01)
  *A47J 17/04* (2006.01)
  *A47J 19/02* (2006.01)

(52) U.S. Cl.
  CPC ............... *A47J 17/04* (2013.01); *A47J 19/02* (2013.01); *A47J 43/25* (2013.01)

(58) Field of Classification Search
  CPC .. A47J 17/04; A47J 43/24; A47J 17/16; A57J 43/25
  See application file for complete search history.

(56) References Cited

U.S. PATENT DOCUMENTS

| | | | | |
|---|---|---|---|---|
| 3,583,455 A | * | 6/1971 | Ostrowsky | A47J 43/25 241/95 |
| 5,445,069 A | * | 8/1995 | Lucas | A47J 19/02 99/502 |
| 5,702,061 A | * | 12/1997 | Kennedy | A47J 43/255 241/273.3 |
| 6,244,529 B1 | * | 6/2001 | Tardif | A47J 43/255 241/100 |
| 10,039,421 B2 | * | 8/2018 | Benoit | A47J 43/25 |
| 2005/0284309 A1 | * | 12/2005 | de Groote | A47J 17/18 99/508 |
| 2014/0231343 A1 | * | 8/2014 | Jalet | A23N 1/003 210/541 |

* cited by examiner

Primary Examiner — Helena Kosanovic
Assistant Examiner — Ahmad Abdel-Rahman
(74) Attorney, Agent, or Firm — Ference & Associates LLC

(57) ABSTRACT

To improve the safety and efficiency of conventional zesters, the present inventor devised, among other things, a child-friendly bidirectional twist-action zester. One exemplary zester includes a housing and at least two grating elements. The housing defines an interior volume configured to receive at least a portion of a whole citrus fruit, and the first and second grating elements are mounted to the housing such that with their grating teeth face the interior and contact the whole citrus fruit, thereby preventing bloody fingers and knuckles during zesting. Moreover, each grating element includes at least some teeth that are opposite to some teeth in the other grating elements, enabling the zester to produce zest with each back and forth movement of the zester relative the fruit. Some other embodiments add a reamer to the housing, enabling the zester to serve as both as zester and a juicer.

12 Claims, 5 Drawing Sheets

ZESTING DEVICES, ASSEMBLIES, COMPONENTS, AND METHODS

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright © 2015, TALISMAN DESIGNS, LLC.

RELATED APPLICATION

The present application claims priority to U.S. Provisional Patent Application 62/129,587, which was filed on Mar. 6, 2015 and which is incorporated herein by reference in its entirety.

TECHNICAL FIELD

Various embodiments of the invention relate generally to zesting devices and related methods.

BACKGROUND

Zest is a food ingredient taken from the outer skin or peel of citrus fruits, such as lemons, limes, oranges, and citrons, and added to foods as a flavoring. Zest is typically prepared directly from fresh fruit prior to use, by scraping or grating the fruit peel using a long, narrow fine-tooth grater, known as a zester.

The present inventors have recognized that conventional zesters suffer from at least two problems or shortcomings. First is that the zester is much longer than the fruit being zested. This means that the vast majority of its teeth are not only exposed as the tool is worked across the handheld fruit, but also positioned to scrape and cut the fingers and knuckles of its users. The risk is significant enough that most parents would never allow young children to zest. Second is that the straight and flat form of the zester results in only a small number of its teeth contacting the surface of round fruit, producing only a small amount of zest per each stroke. This means that the tool is ultimately inefficient and time-consuming to use. Moreover, the straight form factor not only means that more metal is manufacturing these conventional zesters, but also that take up more storage space in already crowded kitchen drawers.

Accordingly, the present inventors have identified a need for a better way of zesting.

SUMMARY

To address one or more of these and/or other needs or problems, the present inventor devised, among other things, one or more exemplary systems, kits, methods, devices, assemblies, and/or components related to making zesting both safer and faster.

In one exemplary embodiment, the invention takes the form of a hand-held cylindrical zesting device. The device includes a plastic dome-like housing having a generally circular sidewall that fits around a portion of a citrus fruit. The sidewall includes a notch or other opening covered with a curved metal grating structure. To zest, a user places one side of a citrus fruit inside the housing against the grating structure and then twists the housing, moving the grating against the peel of the fruit to produce desired zest. In some embodiments, the metal grating structure includes two groups of grating teeth, with the teeth in one group oriented in an opposite direction from those in the other, thereby enabling users to twist the housing (or the fruit) back and forth to product zest with each forward and backward twist.

In contrast to conventional straight-form zesters, the exemplary zesting device encloses the sharp teeth of the grater inside a housing so that only the fruit can contact them during the zesting, eliminating the risk of bloodied fingers and knuckles. Moreover, the curved grating structure conforms to the roundness of citrus fruit, providing more zest for each stroke and thus saving even more time over conventional zesters. Furthermore, the bidirectional grating teeth, which enable zesting in both directions provides an even greater boost in zesting efficiency.

In some embodiments, the device includes two or more graters mounted into the circular sidewall of the housing, at least doubling the zest output per stroke and further enhancing zesting efficiency. Also, in some embodiments, the cylindrical housing is hinged on one side, enabling it to be opened up to fit around larger citrus fruits. Thus, some embodiments of the present invention not only improve zesting safety, but also significantly improve zesting efficiency while promising also to reduce the cost of manufacture through less reliance on metal parts.

Some embodiments of the present invention also serve as cheese graters, specifically allow for safer and/or bidirectional grating of cheese in rotary or planar grating configurations. For example, some embodiments includes a rectangular prismatic housing having interior facing grating elements on opposing sides, and the sides spaces to receive a rectangular or other form of block cheese. The cheese and/or housing are moved relative to the other to produce grated cheese. In some rotary embodiments, the a multi-pronged housing is configured to receive a block of cheese, for example a circular cylindrical block or a square cylindrical block, with the prongs biased via manual pressure or mechanical means against the block of cheese as the housing or block of cheese is rotated against each other.

BRIEF DESCRIPTION OF THE DRAWINGS

Various embodiments are described herein with reference to the following attached figures. These figures are annotated with reference numbers for various features and components, and these numbers are used in the following description as a teaching aid, with like numbers referring to the same or similar features and components.

DESCRIPTION OF EXEMPLARY EMBODIMENT(S)

This document, which incorporates drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

Figure 1:
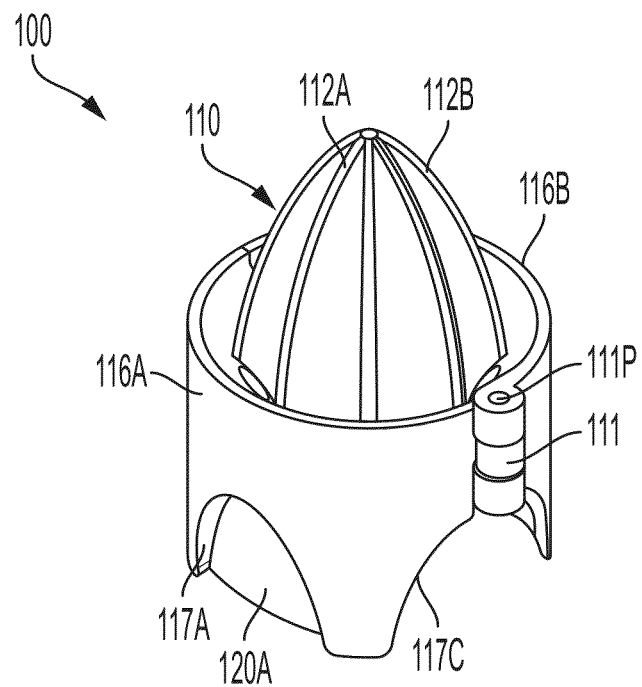
FIG. 1 is a perspective view of an exemplary zesting assembly corresponding to one or more embodiments of the present invention.
Figure 2:
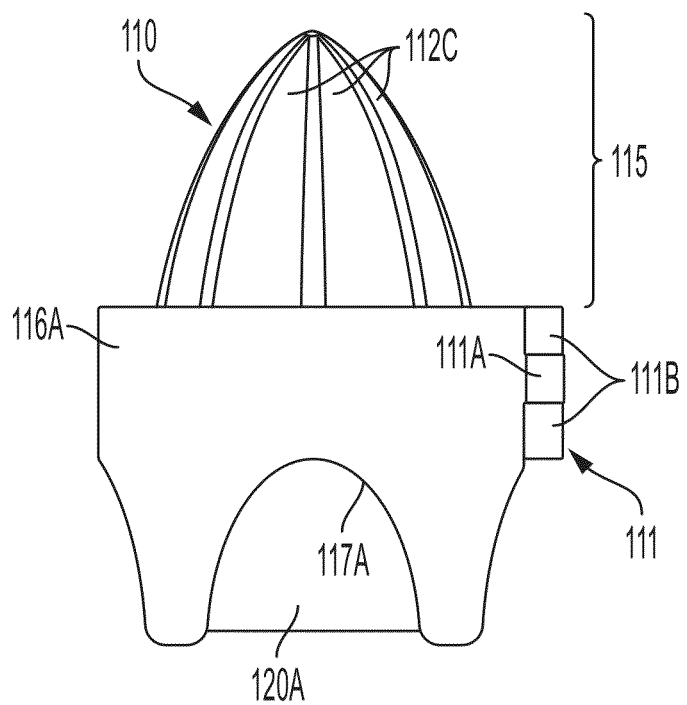
FIG. 2 is a side view of the FIG. 1 zesting assembly corresponding to one or more embodiments of the present invention.
Figure 3:
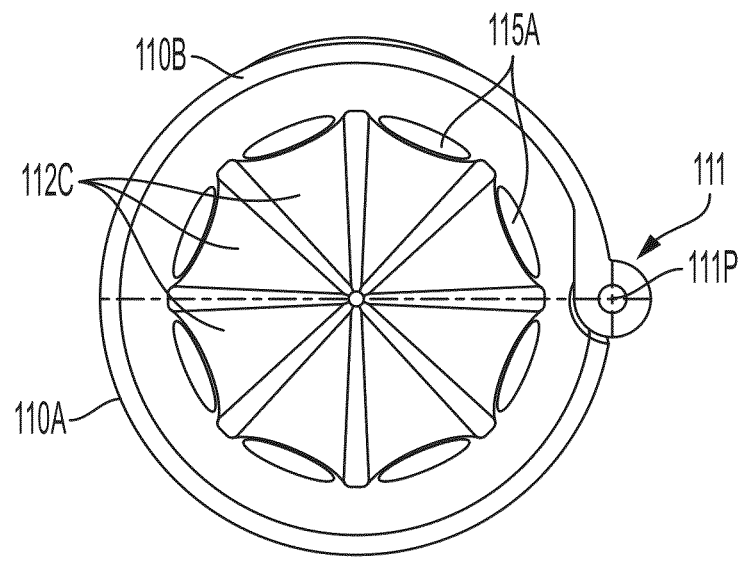
FIG. 3 is a back view of FIG. 1 zesting assembly corresponding to one or more embodiments of the present invention.
Figure 4:
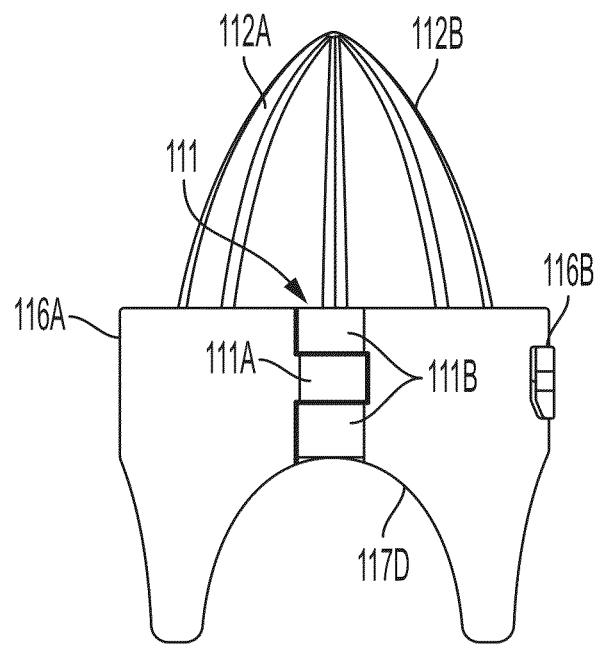
FIG. 4 is a top view of the FIG. 1 zesting assembly, corresponding to one or more embodiments of the present invention.
Figure 5:
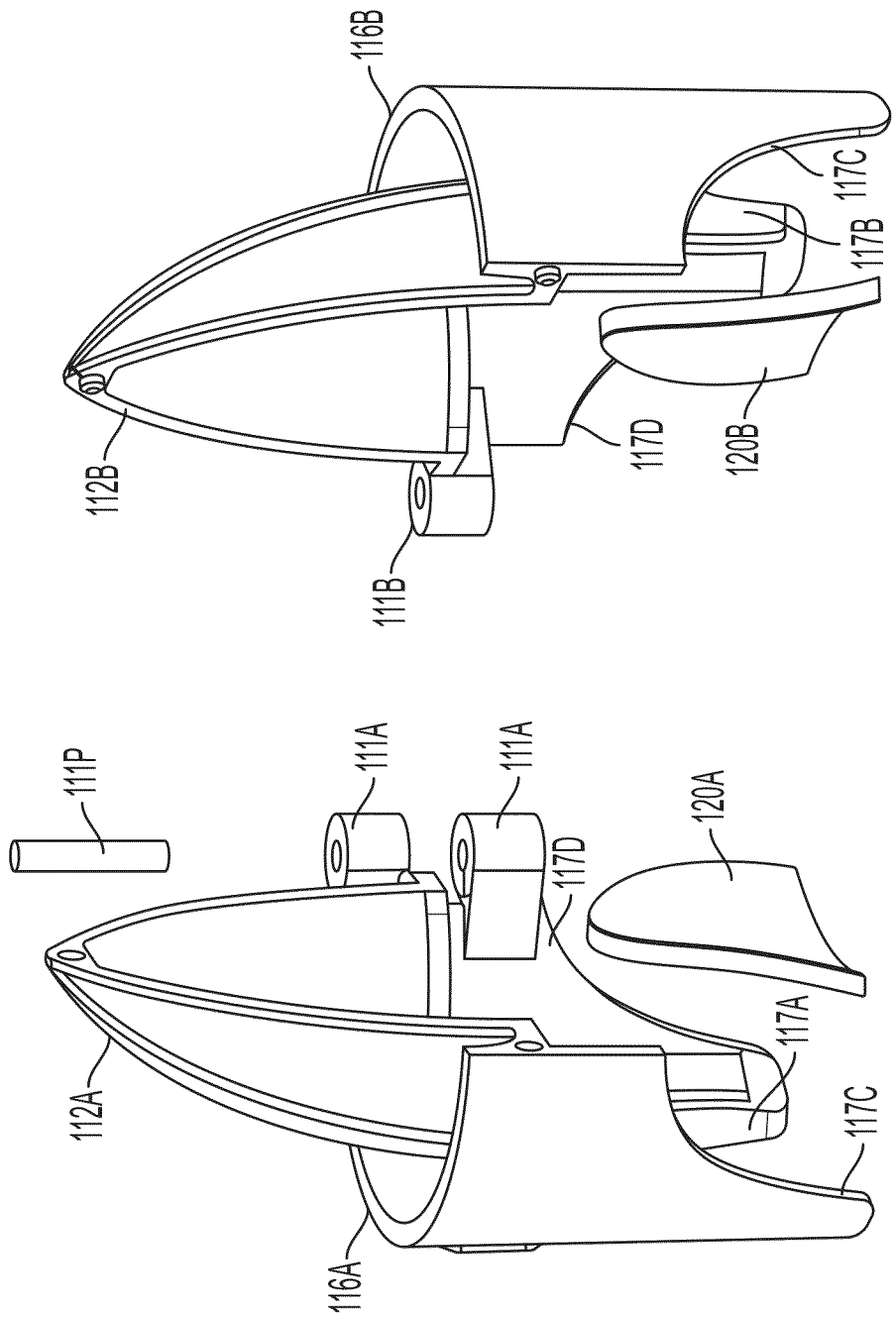
FIG. 5 is an exploded perspective view of the FIG. 1 zesting assembly, corresponding to one or more embodiments of the present invention.
Figure 6:
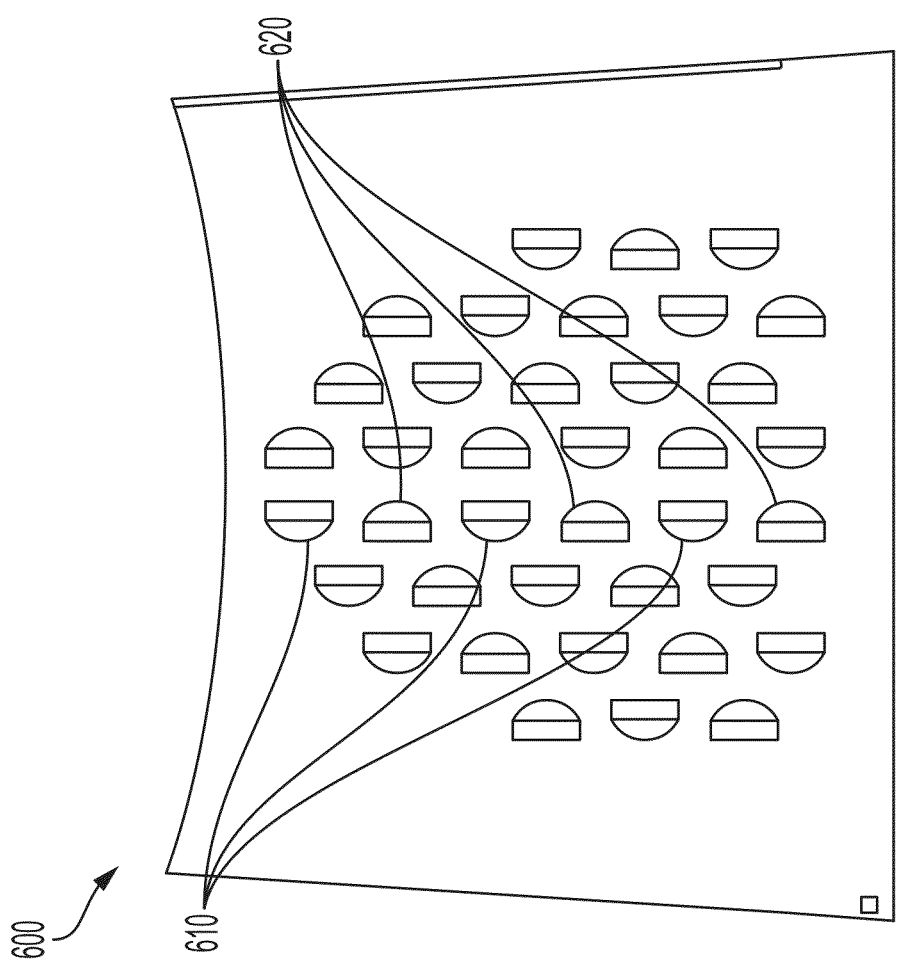
FIG. 6 is a perspective view of an exemplary component suitable for use within the FIG. 1 zesting assembly, corresponding to one or more embodiments of the present invention.

FIGS. 1, 2, 3, and 4, show respective perspective, side, back, and top views of an exemplary zesting assembly 100 incorporating various teachings of the present invention. FIG. 5 is an exploded perspective view. Zesting assembly 100 includes a cylindrical plastic housing 110, and metal zester blades 120A and 120B. Housing 110, which opens like a claim shell via hinge assembly 111 on one side, includes an upper dome portions 112A and 112B, lower cylindrical sidewall portion 116A and 116B, with the A and B suffixes designating opposing A and B sides of the housing secured together via hinge pin 111P (shown best in FIG. 5), which extends through interleaved hinged portions 111A and 111B. Upper dome portions 112A and 112B includes vertically oriented grooves 112C which enable the upper dome portions to function as a reamer portion of a juicer 115. Base openings 115A, which are best shown in the top view of FIG. 4 and are circumferentially spaced around the dome portions 112A and 112B, filter seeds and pulp as juice drains down the grooves 112C. Lower cylindrical sidewall portions 116A and 116B include respective arched openings or slots 117A and 117B. Mounted inside of cylindrical sidewall portions adjacent the arched openings 117A and 117B are respective metal zester blades or grating elements 120A and 120B. Slots or arched openings 117C and 117D are shown FIG. 6 shows a front perspective view of a curved zesting insert or grater element 600 which can be used in zester 100 and and in other zesting and grater applications. Grater element 600 includes a group of left oriented grating teeth 610 and a group of right oriented grating teeth 620. In the exemplary embodiment the left teeth and right teeth are interleaved to promote uniform grating in both directions of contact with a fruit, or cheese. In the exemplary embodiment, the left and right teeth cumulatively provide a tooth density of 60 teeth per square inch. Also, in some embodiments the grater element includes tabs on peripheral edge that fit into a slot around the arched opening to secure the grater element to the housing via interference fit.

Figure 7:
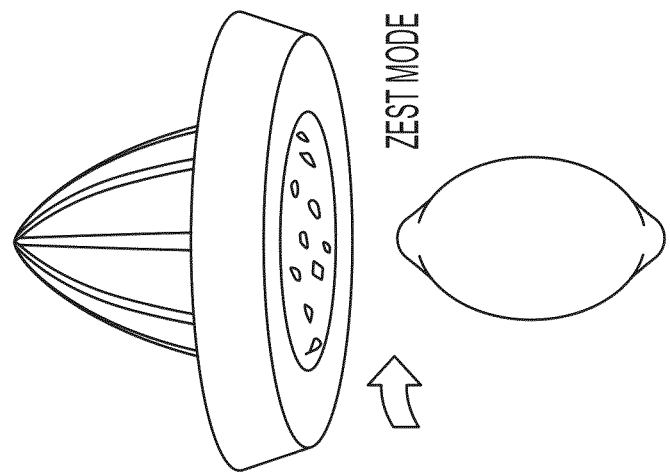
FIG. 7 is a perspective view of another exemplary zesting assembly, corresponding to one or more embodiments of the present invention;.
Figure 7:
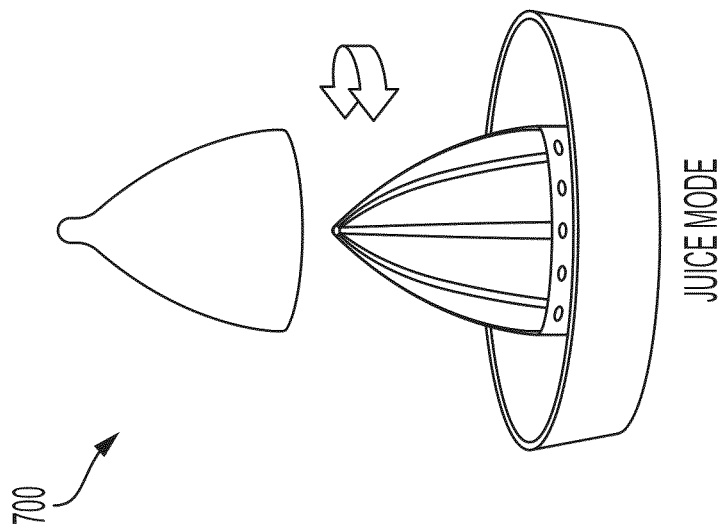

FIG. 7 shows another exemplary zesting assembly 700 incorporating teachings of the present invention. In particular, assembly 700 includes two or more grater elements attached to a circumferential sidewall that is positioned at the base of a reamer structure. In some embodiments the grater elements are curved and bidirectional as previously described. However, some embodiments use multiple conventional grater elements that oriented oppositely to produce similar effect in assembly 700 and others described herein.

CONCLUSION

In the foregoing specification, specific exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

The invention claimed is:

1. A zesting assembly comprising:
a housing comprising a cylindrical shaped sidewall portion and a dome-shaped cover portion located at a top potion of the cylindrical-shaped sidewall portion, the housing defining an interior volume, wherein the cylindrical-shaped sidewall portion defines an opening at a bottom of the cylindrical-shaped sidewall portion, wherein the cylindrical-shaped sidewall portion comprises at least one opening on a side portion of the cylindrical-shaped sidewall portion; and a first food grater being curved to match the cylindrical-shaped sidewall portion, the first food grater being mountable to at least a portion of the cylindrical-shaped sidewall, the first food grater thereby covering the opening;

the first food grater having a set of grating teeth having the grating portion of the grating teeth oriented inwardly toward the interior volume and configured to contact an object located within the interior volume and configured to grate the object located within the interior volume in response to movement of the housing relative to the object while the object is within the interior volume.

2. The zesting assembly of claim 1, wherein the dome-shaped cover portion comprising a reamer structure configured to facilitate juicing of a citrus fruit.

3. The zesting assembly of claim 1, further comprising a second food grater mountable to at least a portion of the cylindrical-shaped sidewall, the second food grater thereby covering a second at least one opening on the side portion of the cylindrical-shaped sidewall portion and having a second set of grating teeth oriented toward the interior volume to contact another region of the object and grate the object located within the interior volume in response to movement of the housing relative to the object while the object is within the interior volume.

4. The zesting assembly of claim 3, wherein the first and second food graters each have first and second sets of grating teeth oriented inwardly towards the interior volume and oppositely to each other.

5. The zesting assembly of claim 4, wherein the first and second sets of grating teeth of each grating element are interleaved.

6. The zesting assembly of claim 1, wherein the first food grater is curved to generally conform to a curvature of the cylindrical-shaped sidewall portion.

7. The zesting assembly of claim 1, wherein the housing is adjustable to accommodate citrus fruit of various circumferences.

8. The zesting assembly of claim 1, wherein the housing is configured to allow manual twisting of the housing relative to the at least a portion of the object.

9. The zesting assembly of claim 1, wherein the at least one opening exposes a back surface of the first food grater.

10. The zesting assembly of claim 3, wherein the housing includes first and second halves that are hinged together to define the interior volume, wherein the first food grater is mounted to the side portion of the cylindrical-shaped sidewall portion of the first half of the housing, and the second food grater is mounted to the side portion of the cylindrical-shaped sidewall portion of the second half of the housing.

11. A child-friendly bidirectional twist-action zesting assembly comprising:

a housing comprising a circular-shaped sidewall portion and a dome-shaped cover portion located at a top potion of the cylindrical-shaped sidewall portion, the housing defining an interior volume, the sidewall portion comprising a side portion comprising at least first opening and second opening on opposing portions of the sidewall portion; and first and second food graters both being curved to match the circular dome-shaped sidewall portion and being mounted to the sidewall portion at the first opening and the second opening respectively, the first and second graters thereby covering the respective first opening and second opening, with the first and second food graters having respective first and second sets of two or more grating teeth having the grating portion of the grating teeth oriented inwardly toward the interior volume to contact respective first and second peel regions of a citrus fruit located within the interior volume and configured to grate the citrus fruit in response to movement of the housing relative to the citrus fruit while the citrus fruit is located within the interior volume, wherein at least a portion of the first set of grating teeth are oriented opposite to at least a portion of the second set of grating teeth.

12. The zesting assembly of claim 11, wherein the housing includes first and second halves that are hinged together to define the interior volume, wherein the first food grater is mounted to the side portion of the sidewall portion of the first half of the housing, and the second food grater is mounted to the side portion of the sidewall portion of the second half of the housing.

* * * * *